United States Patent [19]
Abbott et al.

[11] Patent Number: 5,244,133
[45] Date of Patent: Sep. 14, 1993

[54] WOBBLE-FREE TRAILER HITCH MOUNTING FOR BICYCLE CARRIER

[75] Inventors: Brian Abbott, Santa Monica; Neil Nusbaum, Culver City; Henry Nusbaum, Los Angeles, all of Calif.

[73] Assignee: Hollywood Engineering, Inc., Los Angeles, Calif.

[21] Appl. No.: 816,156

[22] Filed: Dec. 31, 1991

[51] Int. Cl.⁵ .............................................. B60R 9/10
[52] U.S. Cl. .................... 224/42.03 B; 224/42.45 R; 403/370; 248/231.2; 248/231.3
[58] Field of Search .................. 224/273, 282, 42.03 R, 224/42.03 A, 42.03 B, 42.04, 42.05, 42.06, 42.07, 42.08, 42.45 R, 42.42, 42.43, 42.32; 285/421; 403/104, 109, 370, 374, 409.1; 280/288.4, 186, 762, 187, 188; 248/231.2, 231.3, 231.9, 231.6

[56] References Cited

U.S. PATENT DOCUMENTS

| | | | |
|---|---|---|---|
| 2,584,283 | 2/1952 | Oliver et al. | 285/421 X |
| 3,528,691 | 9/1970 | Matich | 403/374 X |
| 3,971,186 | 7/1976 | Havelka et al. | 403/374 X |
| 4,078,276 | 3/1978 | Nunes | 403/409.1 X |
| 4,576,395 | 3/1986 | Longoria | 224/42.07 X |
| 4,640,658 | 2/1987 | Webb | 224/42.08 X |
| 4,850,733 | 7/1989 | Shook | 403/104 |
| 4,915,276 | 4/1990 | Devito | 224/42.3 A X |
| 4,971,509 | 11/1990 | Sechovec et al. | 224/42.08 X |
| 5,038,983 | 8/1991 | Tomososki et al. | 224/42.07 X |
| 5,092,504 | 3/1992 | Hannes et al. | 224/42.03 B X |
| 5,094,373 | 3/1992 | Lovci | 224/282 X |

*Primary Examiner*—Henry J. Recla
*Assistant Examiner*—Glenn T. Barrett
*Attorney, Agent, or Firm*—Natan Epstein

[57] ABSTRACT

A bicycle carrier for mounting to a trailer hitch on an automobile or the like, has a carrier frame for carrying one or more cycles, and a coupling assembly attached to the frame, the coupling assembly including first and second members adapted for insertion into the hitch and a screw adjustable for effecting relative displacement of the two members transversely to the hitch making a tight friction-fit of the coupling to keep the cycle carrier frame from wobbling on the hitch.

20 Claims, 3 Drawing Sheets

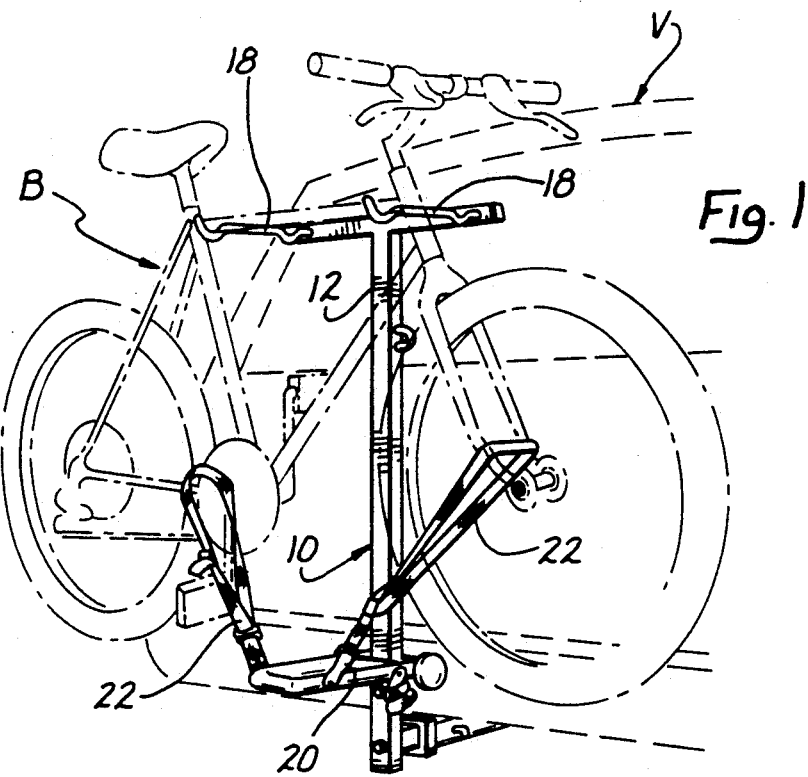
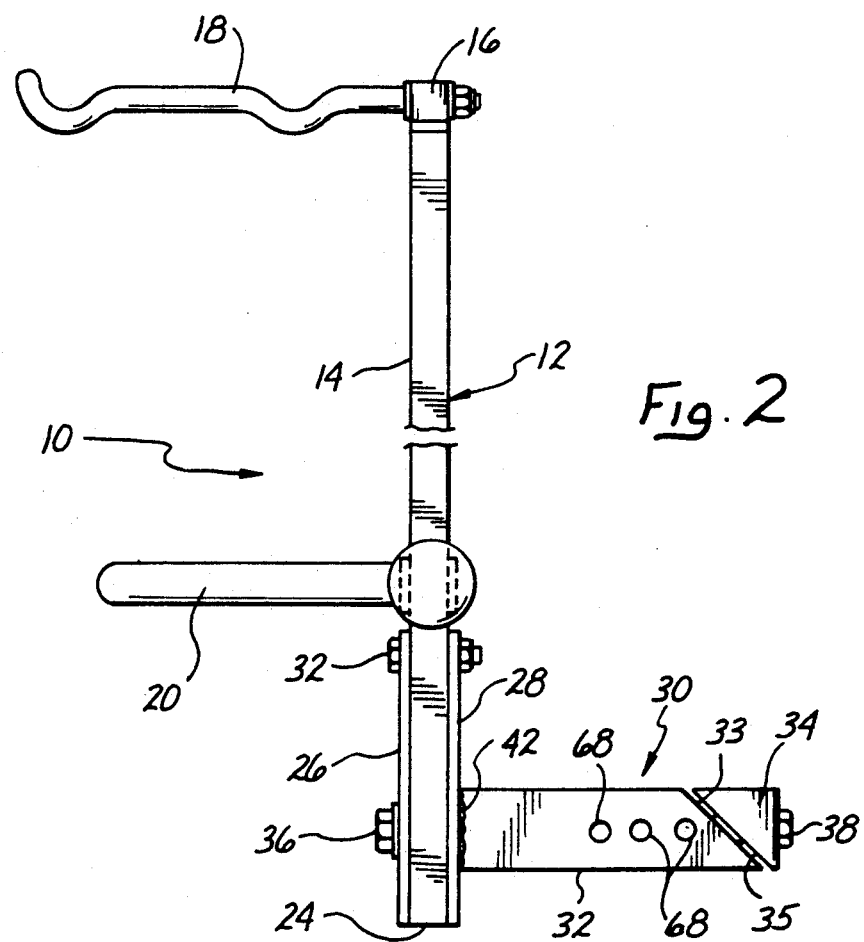

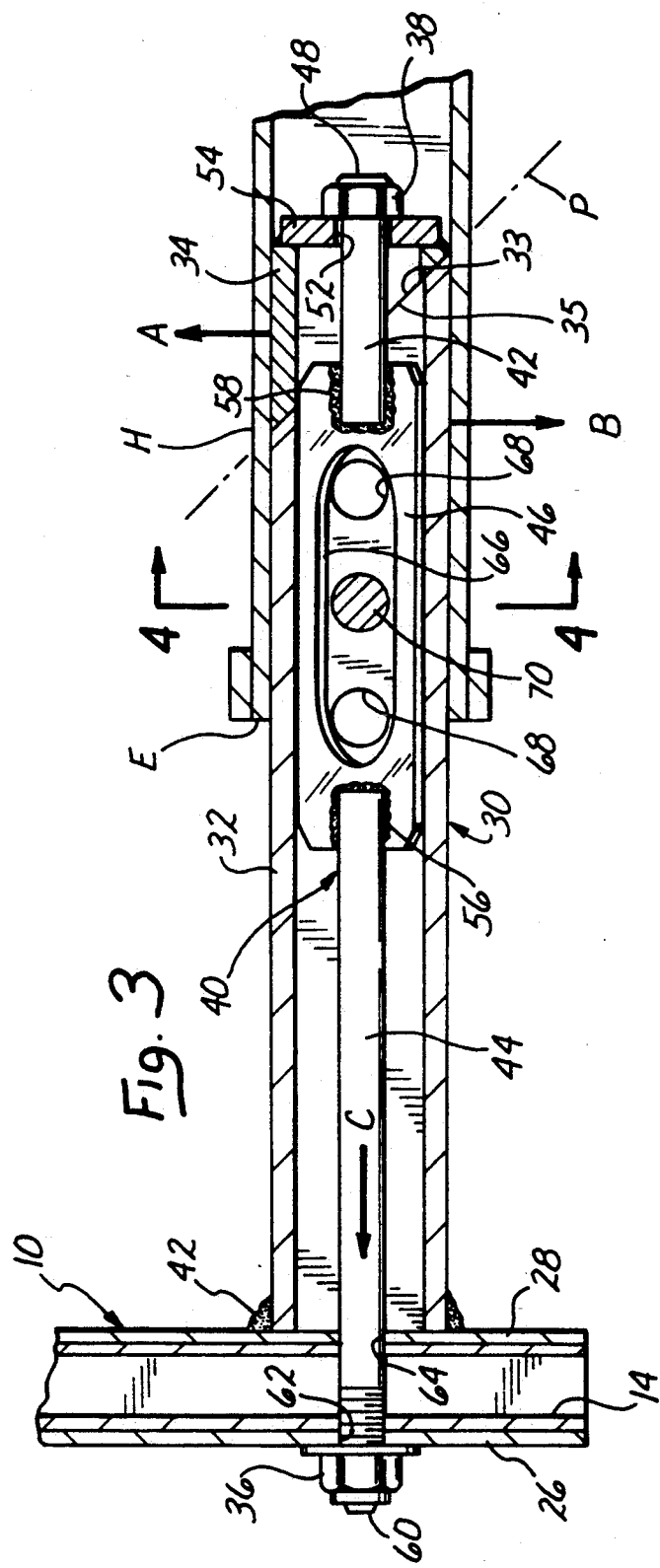
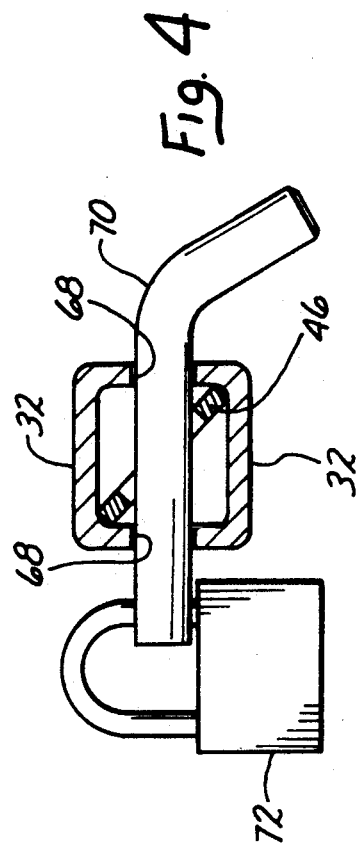

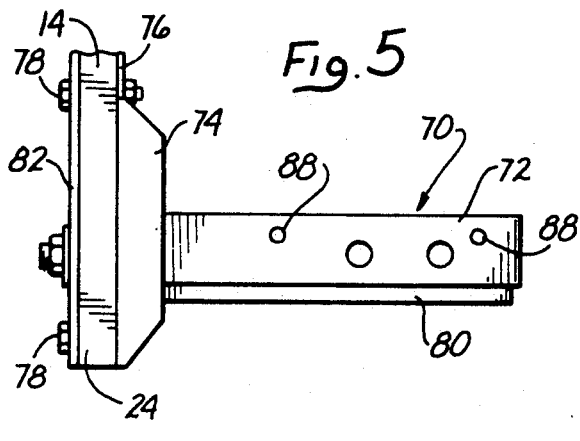
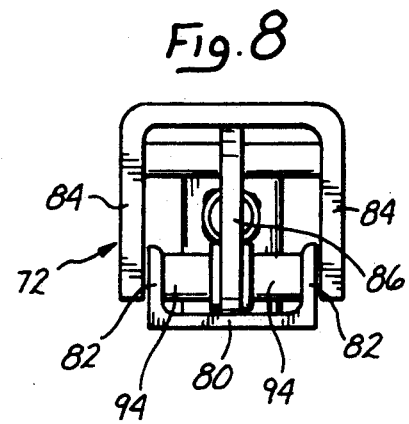
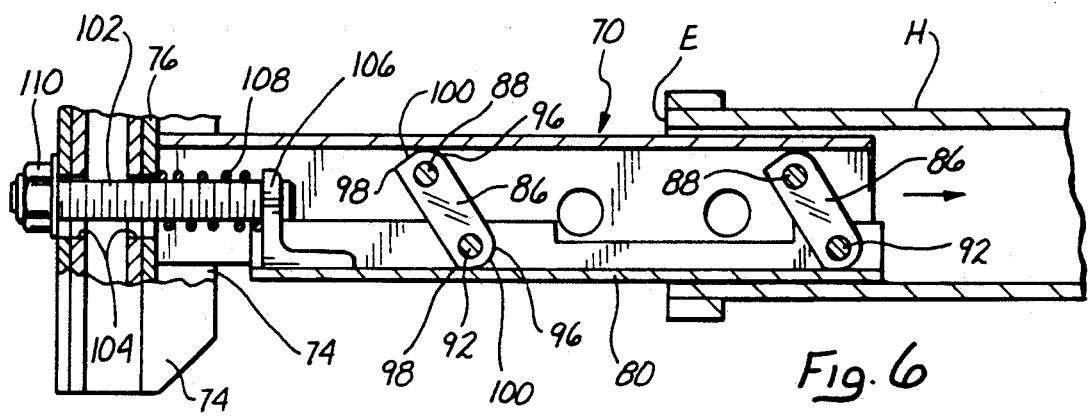
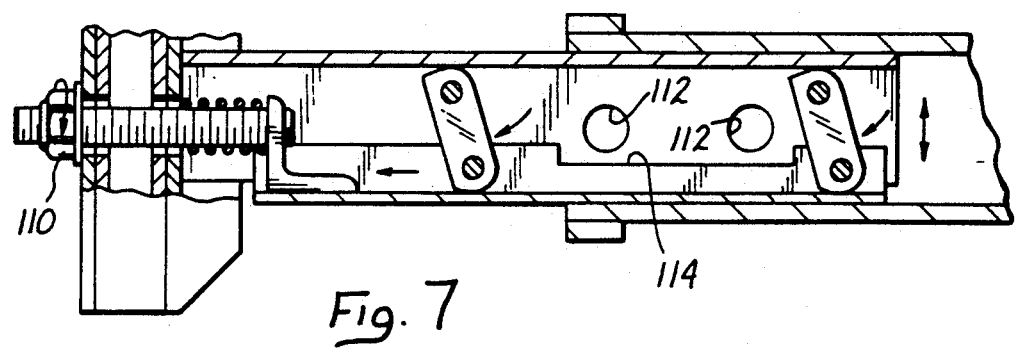

WOBBLE-FREE TRAILER HITCH MOUNTING FOR BICYCLE CARRIER

BACKGROUND OF THE INVENTION

1. Field of the Invention This invention relates to the field of carrier racks for transporting bicycles on a road vehicle, and more particularly pertains to improved trailer hitch mountings for such bicycle carrier racks.

2. State of the Prior Art

Many bicycle carrier racks are in use, some of which are adapted for mounting to an existing trailer hitch on the back of an automobile or truck. A trailer hitch is typically a square tube, welded to the frame of the vehicle under the rear bumper, with an open end for receiving a mating coupling on a trailer. The square tube has a series of hole on opposite sides which allow a locking pin to be inserted transversely to the hitch.

Hitch racks are bicycle carriers adapted for mounting to a trailer hitch by means of a coupling shaft or tube which slides into the open end of the trailer hitch and is retained therein by the conventional locking pin. Existing hitch rack designs are deficient in that the coupling shaft does not make a close fit inside the trailer hitch, and slight movements of the coupling result in significant and noticeable wobble at the upper end of the carrier frame which supports the bicycles. As a result, the bicycles are subjected to unnecessary and potentially damaging vibration and rattling.

What is needed is a more effective trailer hitch mounting for bicycle hitch racks which can eliminate substantially all wobble and shaking of the rack on the transport vehicle during normal road travel. The improved mounting must be dependable, easy to use and of relatively simple construction.

SUMMARY OF THE INVENTION

This invention addresses the shortcomings of the prior art by providing improved trailer hitch mountings which hold the bicycle carrier against wobbling on the trailer hitch. According to this invention, a carrier rack has a frame for supporting one or more cycles, and a hitch coupling assembly fixed to the frame and slidable into the open end of a trailer hitch. The coupling assembly includes a first member fixed to the frame and a second member movable in relation to the first member. A screw is connected to the movable member and is operative for moving the two members apart in a direction transverse to the trailer hitch. In effect, the width of the coupling assembly expands inside the trailer hitch to eliminate any free play of the coupling, resulting in tight and wobble-free retention of the coupling assembly in the trailer hitch. To positively ensure against accidental separation of the coupling assembly, a locking pin may be inserted through aligned holes in the hitch and the coupling assembly. Two forms of the improved hitch couplings are described.

In a first form of this invention, the first member of the coupling assembly is a tube having an outer end fixed to the carrier frame, and the second member is a wedge block supported on a shaft which extends axially through the tube. The tube and the wedge have opposing end surfaces inclined relative to the shaft. The shaft has a threaded exterior end which can be pulled out of the tube by turning a nut on the exterior end. Pulling on the shaft urges the wedge against the end of the tube so that the wedge slides sideways along the inclined end surfaces, transversely to the tube and the shaft. An intermediate portion of the shaft defines an aperture for passing the locking pin transversely through the center of the tube. The intermediate portion may be a flat elongated plate with a longitudinally extending slot, the plate being held diagonally against rotation in the tube to hold the shaft against turning.

In a second form of this invention, the first member is a first U-shaped channel open along one side. The second member is a second U-shaped channel contained between the side walls of the first channel. The two channels are connected together by two pivotable links in a parallelogram arrangement, so that the two channels can be moved apart while remaining parallel to each other. The first channel is fixed at one end to the carrier frame, and the second channel can be moved by operation of a screw arrangement between a retracted position and an extended position. The pivotable links have ends configured for limiting movement of the second channel at the retracted and extended positions. A series of holes in the side walls of the first channel admit a transverse locking pin for locking the coupling assembly against withdrawal from the hitch.

These and other features and advantages of the present invention will be better understood by reference to the following detailed description of the preferred embodiments taken together with the attached drawings.

BRIEF DESCRIPTION OF THE DRAWINGS

FIG. 1 is a perspective view of a bicycle carrier rack according to this invention mounted to the trailer hitch of a typical road vehicle, with a bicycle on the rack and the transport vehicle being shown in phantom lining;

FIG. 2 is a side elevational view of the carrier rack shown in FIG. 1 fitted with the first form of the improved trailer hitch coupling;

FIG. 3 is a longitudinal section of the hitch coupling of FIG. 2 shown in engagement with a typical trailer hitch;

FIG. 4 is a cross-section of the coupling taken along line 4—4 in FIG. 3;

FIG. 5 is a side view of the second form of the improved hitch coupling;

FIG. 6 is a longitudinal section of the coupling of FIG. 5 shown partially inserted in a trailer hitch;

FIG. 7 shows the coupling as in FIG. 6 fully engaged to the trailer hitch;

FIG. 8 is an end view of the coupling of FIG. 5.

DETAILED DESCRIPTION OF THE PREFERRED EMBODIMENT

With reference to the attached drawings, FIG. 1 shows in phantom lining a bicycle B supported on a carrier rack, generally designated by the numeral 10 and shown in solid lining, for transport on a road vehicle B also shown in phantom lining. The carrier 10 generally includes a tubular frame 12 including a vertical support 14, a cross bar 16 at the upper end of the support 14, and a pair of carrier arms 18 extending from the cross bar for supporting the bicycle B on the frame 12. A U-shaped element 20 is mounted to an intermediate portion of the vertical support 14 and anchors a pair of retaining straps 22 which loop around suitable structural elements of the bicycle and are cinched tight to hold down the bicycle securely on the carrier arms 18. The vertical support 14 is a tube of rectangular cross-section with a lower end 24.

FIG. 2 shows reinforcing plates 26, 28 fixed on opposite sides of the support 14 by an upper bolt and nut assembly 32, and a trailer hitch coupling assembly 30 fixed at a right angle to the vertical support 14 near the lower end 24. As better seen in FIG. 3, the coupling assembly 30 includes two retaining members in the form of a coupling tube 32 and a wedge 34, connected by a linkage 40 which extends between two opposite threaded ends 48, 60. Each of the two retaining members 32, 34 is a length of tubing of square cross-section. The coupling tube 32 has an outer end fixed to the vertical support 14 by welding 42 to the plate 28. The coupling tube 32 and wedge 34 have abutting ends 33, 35 respectively, which are cut along a plane P inclined at about a 45 degree angle to the longitudinal dimension of the coupling assembly 30, as indicated by dotted lining in FIG. 3. The tube 32 and wedge 34 abut along opposing end surfaces defined by the thickness of the walls of the tubular elements 32, 34.

A linkage 40 includes an inner shaft section 42 and an outer shaft section 44 rigidly connected in axial alignment by an intermediate plate 46. The outer shaft section 44 is welded at its inner end 56 to one end of the plate 46, while the opposite end of the plate is welded at 58 to the inner shaft segment 42. The inner shaft section 42 terminates in a threaded inner end 48 which passes through hole 52 in an end wall 54 of the wedge 34. A nut 38 threaded on the end 48 makes an interference fit with the end wall 54 and retains the wedge on the linkage end. The hole 52 is larger than the diameter of the shaft section 42 to permit a degree of free lateral movement of the wedge 34 on the shaft. The outer shaft section 44 of the linkage 40 terminates in a threaded outer end 60 which passes through aligned holes 62, 64 in plates 26, 28 and in the vertical support member 14. A nut 36 is threaded on the shaft end 60, and retains the outer end of the linkage to the vertical support 14.

In FIG. 3 the coupling assembly 30 is inserted into the open end E of a typical trailer hitch H, which is fixed to the frame of an automotive vehicle (not shown in the drawing). The square cross-section of the coupler tube 32 and wedge 34 is slightly undersized to the interior dimensions of the trailer hitch H.

A wobble-free mounting of the carrier rack 12 to the hitch H is achieved with the improved mount 30 by drawing the wedge 34 against the inner end of the coupler tube 32 by means of the linkage 40. This is accomplished by turning the outer nut 36, which pulls the linkage 40 towards the left in FIG. 3 along arrow C, pulling the inner nut 38 against the wedge 34. The wedge 34 slides along the inclined plane P and is displaced laterally along arrow A, with a corresponding opposite displacement of the coupling tube 32 along arrow B. The net result is that the tube and the wedge move apart in a direction transverse to the trailer hitch H. The effective width of the coupling assembly 30 is increased such that the wedge 34 and the coupling tube 32 are forced against opposite sides of the hitch tube. The results is a secure and wobble free joint between the coupling assembly 30 and the hitch tube H to minimize or eliminate wobbling of the rack frame 12.

The coupling tube 32 has three holes 68 on each side sized to receive a locking pin 70, shown in FIG. 4, which passes through similar holes in the trailer hitch H. The plate 46 which connects the two shaft segments 42, 44 has a width which is slightly undersized to the diagonal dimension of the coupling tube 32, as shown in FIG. 4. The plate 46 is held diagonally within the tube 32, allowing the outer nut 36 to be turned without also turning the linkage 40. An elongated slot 66 in the plate 46 extends in line with the shaft sections 42, 44, and is also aligned between the three opposed pairs of holes 68, allowing the locking pin 70 to traverse the coupling tube 32, crossing the longitudinal axis of the linkage 40, as illustrated in FIGS. 3 and 4.

Mounting of the carrier rack 10 on a trailer hitch H is straight forward. In an initial condition, the outer nut 36 is loosened sufficiently to bring the wedge 34 into axial alignment with the tube 32. The aligned elements 32, 34 are then inserted into the open end E of the trailer hitch H. One pair of holes 68 is aligned with an existing pair of holes on the trailer hitch H and the locking pin 70 is inserted through the aligned holes to fix the tube 32 axially in the hitch H. The outer nut 36 is then tightened, pulling the linkage 40 as indicated by arrow C. As has been explained, this pulling force draws the wedge 34 against the end of the coupling tube 32 and brings about relative lateral displacement of the two retaining elements 32, 34 along arrows A and B in FIG. 3, tightening the coupling assembly 30 inside the hitch H. A padlock 72 through a transverse bore in the straight end of the locking pin 70 prevents unauthorized removal of the hicth rack from the trailer hitch.

FIGS. 5 through 8 show a second, alternate coupling assembly 70 for the carrier rack 12 of FIG. 1. The coupling assembly 70 is mounted near the lower end 24 of the vertical support 14 in a manner similar to the mounting of the first coupling assembly 30 in FIG. 2. A U-shaped inner plate 76 and an opposite outer plate 82 are fixed to the vertical support 14 by bolts 78. The plate 76 is bent to form two parallel flanges 74. The coupling assembly 70 includes two U-shaped channel segments, a wider upper channel 72 with its open side facing down, and a narrower lower channel 80 with its open side facing up. The upper channel 72 is welded at one end between the two flanges 74 in perpendicular relationship to the vertical support 14. The lower channel 80 has side walls 82 contained between the side walls 84 of the upper channel 72. The two channels 80, 72 are connected at two longitudinally spaced points by two links 86. Each link is elongated between opposite ends which are pivotally supported on an upper pivot pin 88 and a lower pivot pin 92 respectively. The two pivot pins are supported between the side walls 82, 84 of the upper and lower channels, respectively, as best understood by reference to FIG. 8. Two sleeves 94 are fitted on the lower pin 92 on either side of the link 86 to keep the link centered on the pin between the channel side walls 82 and 84.

The lower channel 80 suspended from the upper channel 72 by the two links 86 together form a parallelogram arrangement where spacing between the two channels is variable. The lower channel 80 can swing through a shallow arc from a retracted position within the upper channel 72, shown in FIG. 6, towards an extended condition where the lower channel 80 drops down and away from the upper channel 72, as shown in FIG. 7. Each end of the links 86 has a rounded corner 96 and a square corner 98. The square corners are both on one side of the link, and the rounded corners are on the opposite side of the element 86. The square corners serve as detents for limiting the arc of travel of the lower channel 80. Movement of the lower channel 80 towards the left in FIGS. 6 and 7 is stopped by the lower corner 98 coming into contact with the lower channel 80 and preventing further rotation of the cam 86 about the lower pin 92. Conversely, movement of the lower channel 80 towards the left in the drawings is stopped by contact of the upper corner 98 with the upper channel 72 which stops rotation of the cam 86 about the upper pin 88.

A screw 102 passes through aligned holes 104 in the vertical support 14 and the plates 82, 76. The inner end of the screw 102 is threaded in a hole in an L-shaped plate 106 which is fixed, as by welding, to the lower channel 80. A coil spring 108 is compressed between the plate 76 on the vertical support 14 and the L plate 106, urging the lower channel 80 towards the retracted position of FIG. 6. In its retracted condition, the coupling assembly 70 is slightly undersized to the internal dimension of the trailer hitch H, and can be inserted into the open end E as in FIG. 6. A nut 110 threaded on the outer end of the screw 102 is held against the plate 82 by the force of the spring 108. Turning the nut 110 as indicated by the arrow in FIG. 7 draws the screw 102 out of the coupling assembly 70 towards the left in FIG. 7, pulling with it the lower channel 80 through the arc defined by the swing of the links 86. As a result, the lower channel 80 moves from its retracted position of FIG. 6 towards an extended condition limited by the internal dimension of the trailer hitch H. In effect, the width of the coupling assembly is expanded by the displacement of the lower channel 80, resulting in a very tight wedging engagement of the coupling assembly 70 inside the trailer hitch H. The two channels are forced apart along their full length in a direction transverse to the trailer hitch. The entire top surface of channel 72 and the bottom surface of channel 80 are urged against the interior surfaces of the trailer hitch to make a very stable and slip resistant enagement between the coupling assembly and the trailer hitch, which keeps the coupling assembly and the carrier rack 10 from wobbling on the trailer hitch H.

Holes 112 in side walls 84 of the fixed channel 72 can be lined up with similar holes in the trailer hitch H and allow a locking pin to be inserted through both the trailer hitch and the upper channel 72, to positively prevent separation of the coupling assembly and bicycle carrier rack from the trailer hitch, as has been explained in connection with coupling assembly 30 of FIGS. 2-4, and as illustrated in FIG. 4. The side walls 82 of the lower channel 80 are cut down at 114 to avoid blocking the holes 112.

While preferred embodiments of the invention have been described and illustrated for purposes of clarity and example, it must be understood that many changes, substitutions and modifications will become apparent to those possessed of ordinary skill in the art without thereby departing from the scope and spirit of the present invention which is defined by the following claims.

What is claimed is:

1. A bicycle carrier for mounting to a trailer hitch on a road vehicle, comprising:
   a carrier frame for carrying at least one cycle;
   a coupling assembly attached to said frame, said coupling assembly comprising first and second members adapted for insertion into said hitch; and
   screw means extending axially through said first member and operative for effecting relative displacement of said members transversely to said hitch thereby to secure said coupling assembly against wobbling while supporting said frame on the hitch.

2. The carrier of claim 1 wherein said first and second members are U-shaped channels connected by pivotable links in a parallelogram arrangement.

3. The carrier of claim 2 wherein said links are configured for limiting movement of said members between a retracted and an extended position.

4. The carrier of claim 2 wherein said screw means has one end threadingly connected to one of said channels and is axially fixed to said frame, such that rotation of said screw adjusts the spacing between said channels inside the trailer hitch.

5. The bicycle carrier of claim 1 wherein said first and second members have opposing end surfaces inclined relative to said screw means, said screw means being connected to said second member for urging said end surfaces against each other thereby to cause displacement of said members transverse to said screw.

6. The bicycle carrier of claim 3 wherein said first member is a channel member, said screw means extends through said channel member, said screw means has an outer end supported to said frame and an inner end connected to said second member, holes in said channel member for receiving a locking pin transversely to said screw means through said trailer hitch, said screw means having an intermediate portion defining an aperture for passing said pin.

7. A bicycle carrier for mounting to a trailer hitch on a road vehicle, comprising:
   a frame for carrying at least one cycle and a coupling assembly insertable into said trailer hitch for supporting said frame on said trailer hitch;
   said coupling assembly comprising a first channel member configured to make a sliding fit into said hitch, said frame being supported on an outer end of said first channel member, a second channel member movable between a retracted and an extended position relative to said first channel member, link means connecting said channel members, and screw means operative for moving said second channel member from said retracted to said extended position thereby to secure said coupling against wobbling in said hitch.

8. The carrier of claim 7 further comprising a plurality of side openings in said first channel member for admitting a looking pin transversely through said coupling assembly for securing said assembly against withdrawal from said hitch.

9. The carrier of claim 7 wherein said link means comprise detent means for limiting movement of said second channel member at said retracted and said extended positions.

10. The carrier of claim 7 wherein said link means are each pivoted at opposite ends thereof to one of said channel members, each end including an edge defining said detent means.

11. A bicycle carrier for mounting to a trailer hitch on a road vehicle, comprising:
   a frame for carrying at least one cycle and a coupling assembly fixed to said frame and insertable into said trailer hitch for supporting said frame on said trailer hitch;
   said coupling assembly comprising a first channel member configured to make a sliding fit into said hitch, said frame being supported on an outer end of said first channel member, a second channel member connected to said first channel member by pivotable links in a parallelogram arrangement, screw means mounted to said frame and operable for separating said channel segments and tighten said coupling assembly against wobbling in said trailer hitch.

12. A bicycle carrier for mounting to a trailer hitch on a road vehicle, comprising:
a frame for carrying at least one cycle and a coupling assembly insertable into said trailer hitch for supporting said frame on said trailer hitch;
said coupling assembly configured to make a sliding fit into said hitch and comprising an elongated support member and a wedge member, said frame being supported on an outer end of said support member, said members having inclined opposing end surfaces, screw means extending through said support member, said screw means having an outer end connected to said frame and an inner end connected to said second member, said screw means being operative for urging said inclined surfaces against each other to cause displacement of said members transverse to said screw and make frictional retentive engagement of said coupling assembly with said hitch;
holes in said support member for receiving a locking pin transversely to said screw means, said screw means having an intermediate portion defining an aperture for passing said pin.

13. The bicycle carrier of claim 12 wherein said intermediate portion is a flat elongated plate with a longitudinally extending slot therein.

14. The bicycle carrier of claim 12 wherein said screw means comprises two axially aligned threaded screws sections rigidly connected by said intermediate portion.

15. The bicycle carrier of claim 14 wherein said intermediate portion is a flat elongated plate with a longitudinally extending slot therein, said plate being held against rotation in said supporting member.

16. The bicycle carrier of claim 13 wherein said supporting member is a tube of square cross-section and said plate is diagonally captive in said tube.

17. The bicycle carrier of claim 12 wherein said inner end of the screw means passes through an axial hole in said wedge member, and an inner nut on said inner end retains said wedge member on said inner end.

18. The bicycle carrier of claim 12 wherein an outer nut on said outer end of said screw means is adjustable for pulling said wedge member against said support member.

19. A bicycle carrier for mounting to a tubular trailer hitch on a road vehicle, comprising:
a frame for carrying at least one cycle and a coupling assembly insertable into said trailer hitch for supporting said frame on said trailer hitch;
said coupling assembly comprising a square tube having an outer end affixed to said frame, a wedge supported on screw means extending axially through said tube, said tube and said wedge having opposing end surfaces inclined relative to said screw means, said screw means being adjustable for causing relative transverse displacement of said wedge relative to said tube along said inclined surfaces, said screw means having an intermediate portion defining an aperture for passing a locking pin transverse to said tube.

20. The bicycle carrier of claim 19 wherein said screw means includes a shaft with opposite threaded ends rotatably supported to said frame and said wedge, and said intermediate portion is a flat elongated plate with a longitudinally extending slot therein, said plate being held diagonally against rotation in said tube thereby to hold said shaft against turning, said screw means including a nut on an outer end of said shaft adjustable for pulling said shaft through said tube to urge said opposing surfaces against each other.

* * * * *